US011302155B2

(12) United States Patent
Edwards et al.

(10) Patent No.: US 11,302,155 B2
(45) Date of Patent: Apr. 12, 2022

(54) COUNTERFEIT DETECTION APPARATUS

(71) Applicant: Capital One Services, LLC, McLean, VA (US)

(72) Inventors: Joshua Edwards, Philadelphia, PA (US); Abdelkader Benkreira, New York, NY (US); Michael Mossoba, Arlington, VA (US); Rajko Ilincic, Annandale, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/121,213

(22) Filed: Dec. 14, 2020

(65) Prior Publication Data

US 2021/0134127 A1 May 6, 2021

Related U.S. Application Data

(62) Division of application No. 16/387,722, filed on Apr. 18, 2019, now Pat. No. 10,867,484, which is a division of application No. 15/915,881, filed on Mar. 8, 2018, now Pat. No. 10,311,682.

(51) Int. Cl.

| | |
|---|---|
| ***G06Q 40/00*** | (2012.01) |
| ***G07D 11/00*** | (2019.01) |
| ***G07F 19/00*** | (2006.01) |
| ***G06K 15/00*** | (2006.01) |
| ***G08B 21/18*** | (2006.01) |
| ***G07D 7/14*** | (2006.01) |

(52) U.S. Cl.

CPC ............ *G07F 19/211* (2013.01); *G07D 7/14* (2013.01); *G08B 21/18* (2013.01)

(58) Field of Classification Search

CPC ........ G08B 13/19663; G08B 13/19673; G08B 21/18; G07F 19/211; G07F 19/20; G06Q 20/401; G06Q 20/4016; G07D 7/14

USPC .................................................. 235/379, 383

See application file for complete search history.

(56) References Cited

U.S. PATENT DOCUMENTS

| | | | | |
|---|---|---|---|---|
| 5,861,877 | A | 1/1999 | Kagayama et al. | |
| 8,138,916 | B1 * | 3/2012 | Gonzalez ............... | G07D 11/30 340/540 |
| 2002/0163633 | A1 | 11/2002 | Cohen | |
| 2003/0029693 | A1 | 2/2003 | Ouyang et al. | |
| 2003/0095246 | A1 | 5/2003 | Jung | |
| 2004/0183748 | A1 | 9/2004 | Silverbrook et al. | |

(Continued)

*Primary Examiner* — Tuyen K Vo

(74) *Attorney, Agent, or Firm* — DLA Piper LLP (US)

(57) ABSTRACT

Embodiments disclosed herein generally relate to an apparatus for counterfeit detection and a method implementing the same. In one embodiment, as apparatus is disclosed herein. The apparatus includes a first end, a second end, an elongated body, an ink cartridge, a controller, and a trigger. The elongated body extends from the first end to the second end. The elongated body defines a cavity therein. The ink cartridge is disposed in the cavity. The controller is positioned within the cavity. The controller is configured to communicate with at least one computing system remote from the apparatus. The trigger is in electronic communication with the controller. The trigger extends at least partially though the elongated body. The trigger is actionable between a first position and a second position. A change from the first position to the second position transmits an electronic signal to the controller.

20 Claims, 4 Drawing Sheets

100

(56) References Cited

U.S. PATENT DOCUMENTS

| | | | |
|---|---|---|---|
| 2008/0236990 A1 | 10/2008 | Ehrich et al. | |
| 2009/0152475 A1 | 6/2009 | Sasaki et al. | |
| 2009/0201131 A1 | 8/2009 | Delia et al. | |
| 2012/0057921 A1 | 3/2012 | Brennan | |
| 2012/0217416 A1 | 8/2012 | Decoux | |
| 2012/0221944 A1 | 8/2012 | Bloomfield et al. | |
| 2012/0257189 A1 | 10/2012 | Haas et al. | |
| 2013/0044934 A1 | 2/2013 | Tolene | |
| 2013/0078162 A1 | 3/2013 | Dobbs | |
| 2016/0357275 A1 | 12/2016 | Ribeiro | |
| 2017/0123038 A1* | 5/2017 | Griggs ................. | G08B 29/188 |
| 2017/0193727 A1 | 7/2017 | Van Horn et al. | |

* cited by examiner

COUNTERFEIT DETECTION APPARATUS

CROSS-REFERENCE TO RELATED APPLICATION

This is a divisional of U.S. application Ser. No. 16/387,722, filed Apr. 18, 2019, which is a divisional of U.S. application Ser. No. 15/915,881, filed Mar. 8, 2018, now U.S. Pat. No. 10,311,682, issued Jun. 4, 2019, which are incorporated by reference in their entireties.

TECHNICAL FIELD

Embodiments disclosed herein generally relate to an apparatus for counterfeit detection and a method implementing the same.

BACKGROUND

Any business that accepts cash as a form of payment may be subject to several dangers and delays. Even though many businesses accept cash payments from its customers, very few businesses operate with cash outside of that context. Although changes to currency have made it easier for businesses to decipher between genuine and fraudulent banknotes, the increases in technology have improved the capabilities of bad actors fraudulently re-producing banknotes.

SUMMARY

Embodiments disclosed herein generally relate to an apparatus for counterfeit detection and a method implementing the same. In one embodiment, as apparatus is disclosed herein. The apparatus includes a first end, a second end, an elongated body, an ink cartridge, a controller, and a trigger. The elongated body extends from the first end to the second end. The elongated body defines a cavity therein. The ink cartridge is disposed in the cavity. The controller is positioned within the cavity. The controller is configured to communicate with at least one computing system remote from the apparatus. The trigger is in electronic communication with the controller. The trigger extends at least partially though the elongated body. The trigger is actionable between a first position and a second position. A change from the first position to the second position transmits an electronic signal to the controller.

In some embodiments, the ink cartridge that is disposed in the cavity includes an iodine-based ink.

In some embodiments, the controller includes a first communication link that includes at least a network interface card or cellular adapter.

In some embodiments, the controller communicates with a first remote computing system of the at least one computing system via the first communication link.

In some embodiments, the controller includes a second communication link that includes at least one of a Bluetooth adapter, a further network interface card, a radio-frequency identification (RFID) adapter, a near-field communication (NFC) adapter, and a ZigBee adapter.

In some embodiments, the second communication link tethers the controller to a second remote computing system of the at least one computing system.

In some embodiments, the electronic signal transmitted to the electronic signal is an alert message.

In some embodiments, the trigger returns to the first position after moving to the second position.

In some embodiments, the controller includes a global positioning system (GPS) module.

In another embodiment, an apparatus is disclosed herein. The apparatus includes a counterfeit banknote detection device. The counterfeit banknote detection device includes a trigger and a controller. The trigger is positioned on an outer surface of the counterfeit banknote detection device. The controller is disposed in the counterfeit banknote detection device. The controller is in communication with the trigger. The controller includes a processor and a memory. The memory has programming instructions stored thereon, which, when executed by the processor performs an operation. The operation includes receiving a signal from the trigger. The signal is indicative of an attempt to transact using a counterfeit banknote. The operation further includes generating a message indicating the transaction attempt using the counterfeit banknote. The operation further includes transmitting the message to a computing system remote from the counterfeit banknote detection device.

In some embodiments, the controller further includes a global positioning system (GPS) module.

In some embodiments, the operation of transmitting the message to the computing system remote from the counterfeit banknote detection device includes, the operation of identifying, by the GPS module, a current location of the banknote detection device and appending the current location of the banknote detection device in the message to be transmitted to the computing system.

In some embodiments, transmitting the message to a computing system remote from the counterfeit banknote detection device triggers the computing system to notify an authority of the attempt.

In some embodiments, transmitting the message to a computing system remote from the counterfeit banknote detection device triggers the computing system to time stamp receipt of the message.

In another embodiment, a method is disclosed herein. A computing system receives an indication of an attempt to transaction using a fraudulent bank note. The indication of the attempt is received as an electronic signal from a counterfeit banknote detection device. The computing system records a current time contemporaneous with receipt of the indication. The computing system receives one or more video streams of a facility in which the counterfeit banknote detection device is located. The computing system identifies a portion of the one or more video streams corresponding to the current time. The computing system maps the indication of the attempt to the portion of the one or more video streams.

In some embodiments, wherein receiving the indication of the attempt to transact using the fraudulent banknote, wherein the indication of the attempt is received as the electronic signal from the counterfeit banknote detection device includes the computing system receiving location information corresponding to a location of the counterfeit banknote detection device at the current time.

In some embodiments, the computing system further identifies a location of the counterfeit banknote detection device in the portion of the one or more video streams.

In some embodiments, the computing system generates an alert message to notify an authority of the attempt to transact using the fraudulent banknote.

In some embodiments, receiving the indication of the attempt to transact using the fraudulent banknote, wherein the indication of the attempt is received as the electronic signal from the counterfeit banknote detection device includes the computing system receiving the indication from another computing system tethered to the counterfeit banknote detection device, the other computing system relaying the electronic signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally relate to an apparatus for counterfeit detection and a method implementing the same. Counterfeit banknote detection devices may be conventionally used to detect fraudulent attempts of transacting with counterfeit banknotes. For example, counterfeit banknote detection devices (e.g., pens, markers, writing utensils, and the like) include an ink that is configured to chemically react with one or more components of the material the banknote is printed on. When marked by the counterfeit banknote detection device, the banknote will display an indication that the banknote is genuine or that the banknote is counterfeit. When the banknote is counterfeit, the ink of the counterfeit banknote detection device will chemically react with one or more components of the fraudulent banknote, and provide an indication to a user (e.g., cashier) that the banknote is counterfeit.

There are one or more innate issues that exist in the implementation of taking action following the detection of a fraudulent banknote. For example, existing solutions to detecting a fraudulent banknote include alerting management verbally of the attempt, confronting an issuer of the counterfeit banknote, verbally notifying security, and the like. Further, alert devices, such as an alert button positioned underneath a user's counter or desk, may provide an overt indication to the issuer that the user has summoned management, the authorities, or security. There currently does not exist a discrete way for alerting a third party of a fraudulent banknote attempt.

The present disclosure, however, addresses this issue. Embodiments disclosed herein are generally directed to a counterfeit banknote detection device that includes a trigger (or button) discretely positioned thereon. Accordingly, when a user identifies that a banknote is counterfeit, the user may activate the trigger, which sends a signal to a remote computing device, alerting a third party of a counterfeit attempt, without overtly signaling to the issuer that an alert has been issued.

Figure 1:
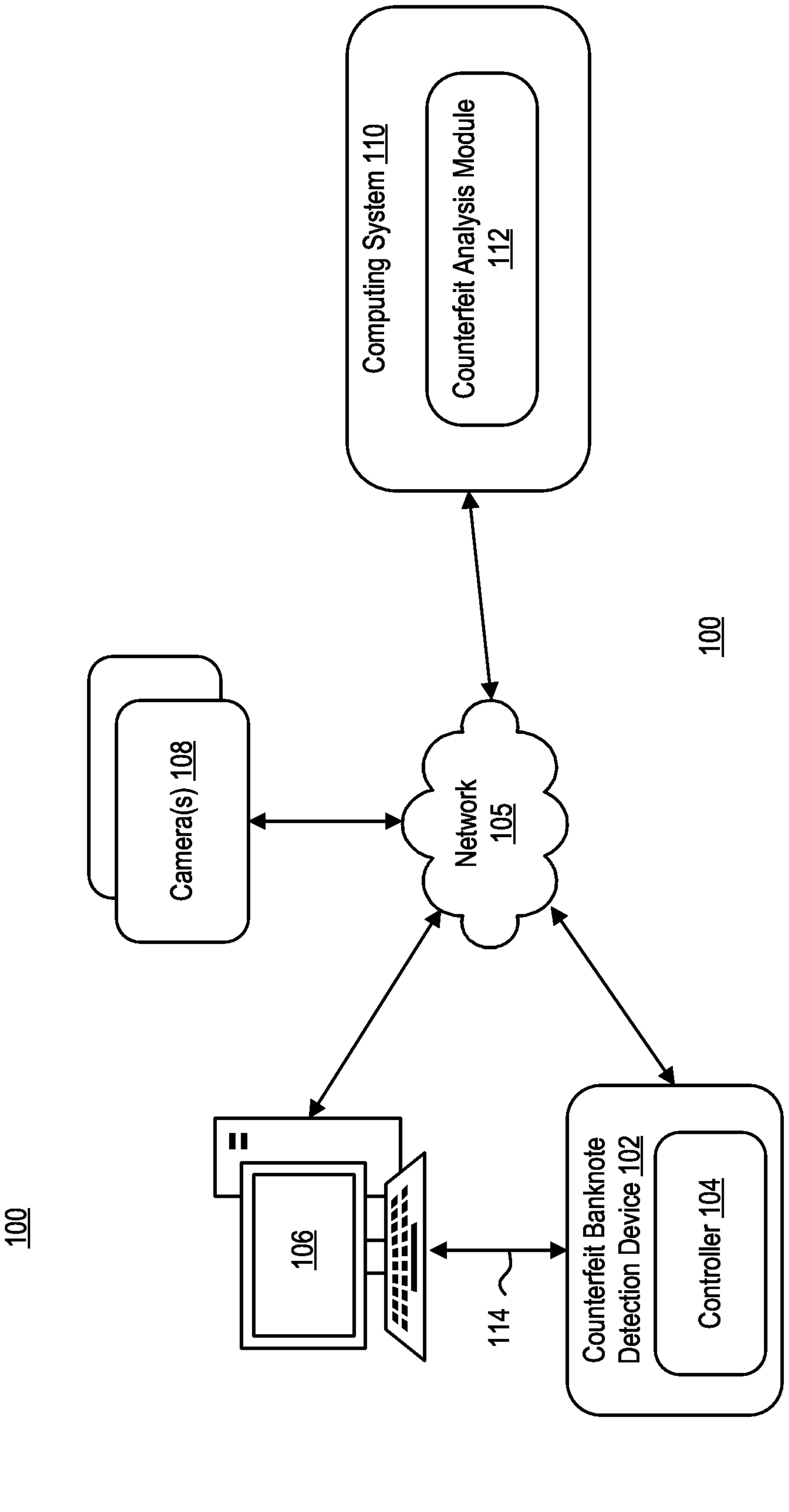
FIG. 1 is a block diagram illustrating a computing environment, according to one embodiment.

FIG. 1 is a block diagram illustrating a computing environment 100, according to one embodiment. Computing environment 100 includes a counterfeit banknote detection device 102, a computing system 106, one or more camera(s) 108 (hereinafter "camera 108"), and computing system 110 communicating over network 105.

Network 105 may be any suitable network, including individual connections via the Internet (e.g., cellular, wireless networks, etc.). In some embodiments, network 105 may connect terminals, services, and computing devices using direct connections, such as radio-frequency identification (RFID), near-field communication (NFC), Bluetooth™, low-energy Bluetooth™ (BLE), WiFi™, ZigBee™, ambient backscatter communications (ABC) protocols, USB, WAN, LAN, and the like. In some embodiments, security concerns may dictate that one or more of these types of connections be encrypted or otherwise secured.

Counterfeit banknote detection device 102 may be operated by user 101. For example, counterfeit banknote detection device 102 may be operated by a cashier in a business facility. Counterfeit banknote detection device 102 is configured to identify whether one or more banknotes submitted by a customer of the business facility is fraudulent. For example, counterfeit banknote detection device 102 may generally include ink that changes a color of a banknote to identify that the banknote is counterfeit. Counterfeit banknote detection device 102 can be configured to record a counterfeit attempt by a customer, responsive to determining that the one or more banknotes received are counterfeit. As illustrated, counterfeit banknote detection device 102 can include controller 104. Controller 104 may generate a signal to computing system 110 when prompted by user. The signal can be indicative of a counterfeit attempt by a customer. As shown, controller 104 may communicate with computing system 110.

Computing system 110 may be a computing system remote from counterfeit banknote detection device 102. In some embodiments, computing system 110 may be positioned in business facility with counterfeit banknote detection device 102. In some embodiments, computing system 110 may be remote from business facility 102. Computing system 110 may include a counterfeit analysis module 112. Counterfeit analysis module 112 can be configured to analyze incoming signals from counterfeit banknote detection device 102. For example, counterfeit analysis module 112 may be configured to carry out the operations discussed below in conjunction with FIG. 3.

Camera 108 can be positioned within business facility. Camera 108 may communicate with computing system 110 via network 105. Camera 108 can be configured to transmit one or more streams of video data to computing system 110. For example, counterfeit analysis module 112 may be further configured to receive one or more streams of video data from camera 108, and analyze the one or more video streams, responsive to receiving a signal from counterfeit banknote detection device 102 that is indicative of a counterfeit attempt.

Computing system 106 also can be positioned within business facility. Computing system 106 may be in communication (e.g., tethered) with counterfeit banknote detection device 102. For example, computing system 106 may be in communication with banknote detection device 102 via communication link 114. Communication link 114 may use one or more wireless connections, such as radio-frequency identification (RFID), near-field communication (NFC), Bluetooth™ low-energy Bluetooth™ (BLE), WiFi™, ZigBee™, and the like. Still further, communication link 114 may be a cellular communication between computing system 106 and counterfeit banknote detection device 102. Generally, computing system 106 may be representative of a point-of-sale device in the business facility. In some embodiments, rather than communicating directly with computing system 110, counterfeit banknote detection device 102 may communicate with computing system 106. Computing system 106 may then forward any signals received from counterfeit banknote detection device 102 to computing system 110 for further analysis with counterfeit analysis module 112.

Figure 2:
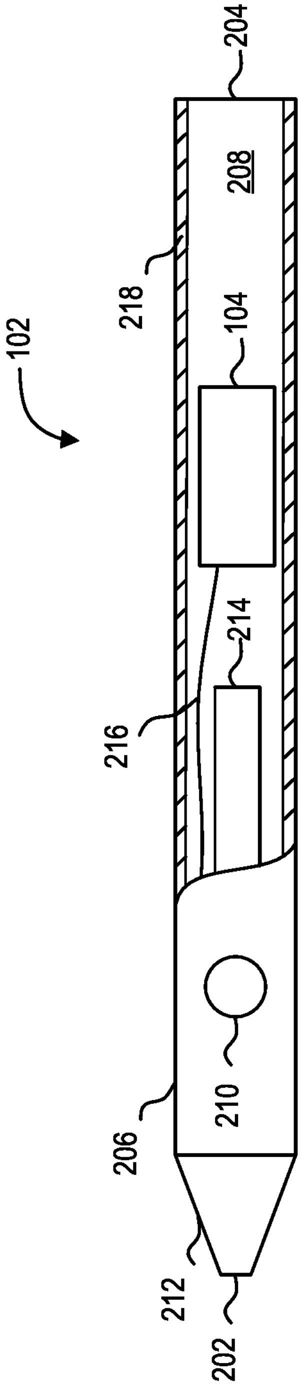
FIG. 2 is a partial cross-sectional view of an apparatus of computing environment of FIG. 1, according to one embodiment.

FIG. 2 is a partial cross-sectional view of counterfeit banknote detection device 102 of computing environment 100 of FIG. 1, according to one embodiment. Counterfeit banknote detection device 102 can include a first end 202, a second end 204, and an elongated body 206. First end 202 is opposite second end 204. Elongated body 206 extends from first end 202 to second end 204. Elongated body 206 defines a cavity 208 therein. For example, cavity 208 may be surrounded by outer walls 218 of elongated body 206.

Counterfeit banknote detection device 102 may further include an ink cartridge 214 and controller 104. Ink cartridge 214 can be disposed in cavity 208. In some embodiments, ink cartridge 214 extends partially exterior to elongated body 206 at first end 202. For example, first end 214 may include a conical tip 212. Ink cartridge 214 may extend partially exterior to elongated body 206 via an opening (not shown) of conical tip 212. Ink cartridge 214 generally includes an iodine-based ink. When counterfeit banknote detection device 102 marks a banknote with the iodine-based ink, the ink will either make no mark (or a yellow-ish mark) on the banknote or the iodine-based ink will make a dark mark (e.g., black) on the banknote. The appearance of the dark mark on the banknote is an indication that the banknote may be counterfeit. Generally, banknotes are formed from a material that does not react with iodine, whereas counterfeit banknotes may be formed from a material that does react with iodine. Thus, by marking the banknote with an iodine-based ink, a user can readily identify whether the received banknote may be counterfeit.

Situations arise, however, in which a user may take action in response to identifying that the banknote may be counterfeit. For example, in conventional systems, a user may confront the customer extending the banknote, the user may notify management, the user may notify security, and the like. It may be difficult, however, for the user to take such remedial actions. For example, the user may be placed in a vulnerable position with the customer.

Counterfeit banknote detection device 102 provides a trigger 210 that allows a user of counterfeit banknote detection device 102 to discretely notify a third party of the counterfeit attempt. In some embodiments, trigger 210 may be positioned on an outer surface of elongated body 206. In some embodiments, trigger 210 may be positioned in cavity 208, such that trigger 210 extends partially through elongated body via an opening (not shown) formed in elongated body 206. In some embodiments, trigger 210 is positioned closer to first end 202 of counterfeit banknote detection device 102. Positioning trigger 210 closer to first end 202 allows a user access to trigger 210 proximate to a finger location while operating counterfeit banknote detection device 210. In some embodiments, trigger 210 may be positioned closer to second end 204 of counterfeit banknote detection device 102. For example, trigger 210 may be positioned proximate an activator in embodiments where counterfeit banknote detection device 102 is a spring-loaded device.

Trigger 210 may be electronically coupled to controller 104. For example, trigger 210 may be electronically coupled to controller 104 via communication link 216. In some embodiments, trigger 210 may act an in input device for controller 104. Trigger 210 may be actionable between a first position (initial position) and a second position. When trigger 210 moves from the first position to the second position, trigger 210 sends an electronic signal to controller 104 via communication link 216. The electronic signal can be indicative of the user detected a counterfeit attempt. Controller 104 may subsequently communicate with computing system 110 via network 105 to indicate that a counterfeit attempt has been detected. In some embodiments, controller 104 may communicate with computing system 106, and computing system 106 may act as an intermediary between controller 104 and computing system 110.

Figure 3:
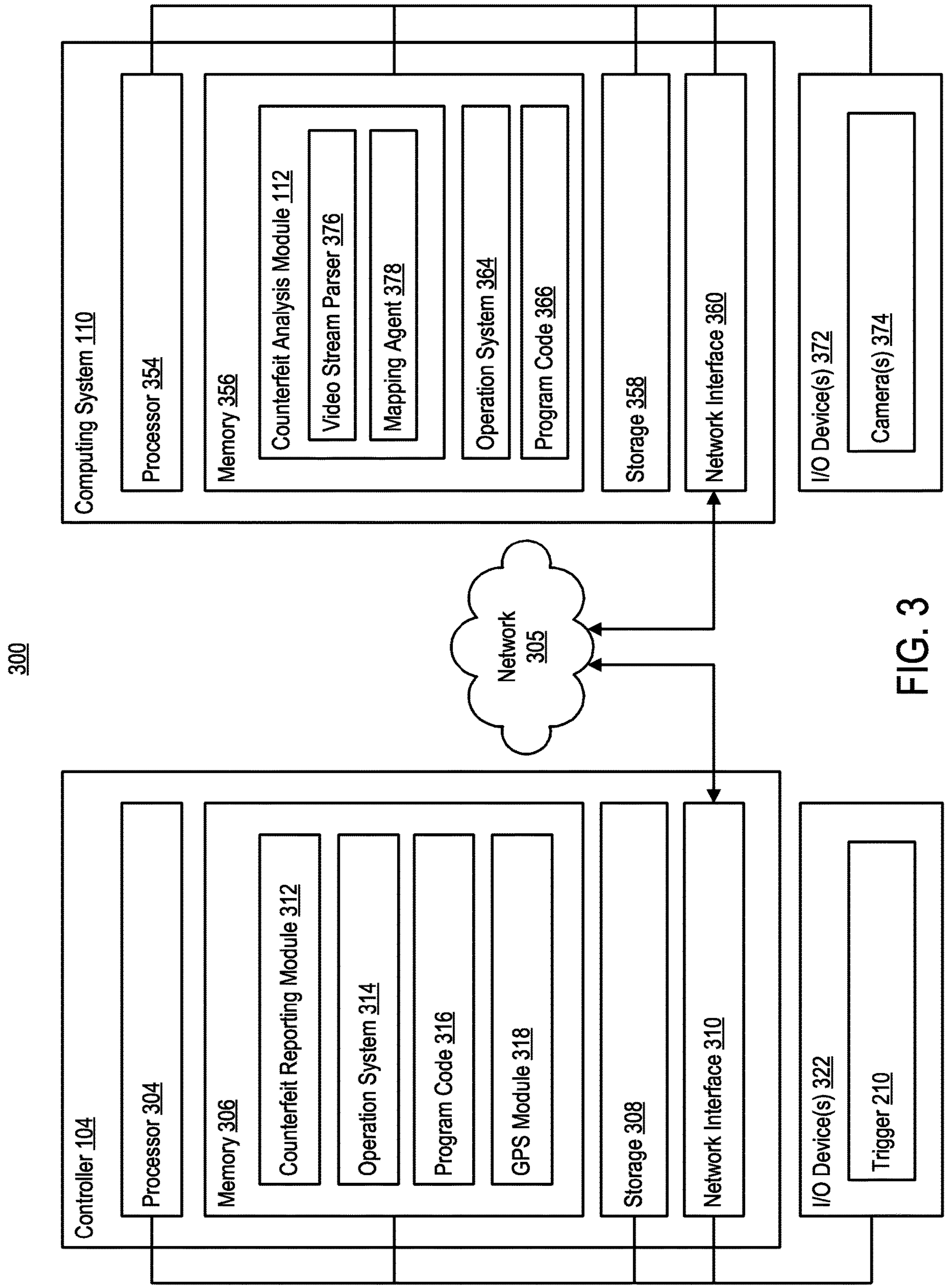
FIG. 3 is a block diagram of a computing environment, according to one embodiment.

FIG. 3 is a block diagram of a computing environment 300, according to one embodiment. Computing environment 300 illustrates controller 104 communicating with computing system 110 via network 305. Although computing system 106 is not illustrated in detail, those skilled in the art could readily understand the role of computing system 106 in embodiments in which computing system 106 is implemented.

Controller 104 can include a processor 304, a memory 306, a storage 308, and a network interface 310. In some embodiments, controller 104 may further include I/O device(s) 322. For example, I/O devices 322 may include trigger 210, that is configured to deliver an electronic signal to controller 104 responsive to moving from a first position to a second position.

Processor 304 can retrieve and execute program code 316 (i.e., programming instructions) stored in memory 306, as well as stores and retrieves application data. Processor 304 is included to be representative of a single processor, multiple processors, a single processor having multiple processing cores, and the like. Network interface 310 may be any type of network communication allowing controller 104 to communicate externally via computing network 305. For example, network interface 310 may include one or more of a wireless adapter, network interface card, cellular adapter, RFID module, NFC module, Bluetooth™ module, and the like. For example, network interface 310 may allow controller 104 to communicate with computing system 110.

Storage 308 may be, for example, a disk storage device. Although shown as a single unit, storage 308 may be a combination of fixed and/or removable storage devices, such as, but not limited to, fixed disk drives, removable memory cards, optical storage, network attached storage (NAS), storage area network (SAN), and the like.

Memory 306 may include counterfeit reporting module 312, operating system 314, program code 316, and global positioning system (GPS) module 318. Program code 316 may be accessed by processor 304 for processing (i.e., executing program instructions). Program code 316 may include, for example, steps discussed below in conjunction with FIG. 4. In a specific example, processor 304 may access program code 316 to execute an operation responsive to receiving an indication of counterfeit detection. GPS module 318 may be configured to track a location of controller 104. In operation, for example, GPS module 318 may be configured to track a location of counterfeit banknote detection device 102 throughout business facility, such that a user that operated counterfeit banknote detection device 102 can be easily identified within business facility.

Counterfeit reporting module 312 can be configured to communicate with computing system 110 responsive to receiving a signal from trigger 210. For example, responsive to receiving a signal from trigger 210 that is indicative of a counterfeit attempt, counterfeit reporting module 312 may generate an alert message to be transmitted to computing system 110. The alert message alerts computing system (e.g., operated by a third-party) of a potential counterfeit attempt. In some embodiments, alert message may include the coordinates of controller 104 in business facility. For example, counterfeit reporting module 312 may communicate with GPS module 318 to identify a current location of counterfeit banknote detection device 102.

Although memory 306 is shown as a single entity, memory 306 may include one or more memory devices having blocks of memory associated with physical addresses, such as random access memory (RAM), read only memory (ROM), flash memory, or other types of volatile and/or non-volatile memory.

Computing system 110 can include a processor 354, a memory 356, a storage 358, and a network interface 360. In some embodiments, computing system 110 may further include I/O device(s) 372. For example, I/O devices 372 may include one or more cameras 374. One or more cameras 374 may be positioned in the business facility in which counterfeit banknote detection pen 102 is located. Accordingly, each of one or more cameras 374 is configured to capture one or more streams of video data of business facility.

Processor 354 retrieves and executes program code 366 (i.e., programing instructions) stored in memory 356, as well as stores and retrieves application data. Processor 354 is included to be representative of a single processor, multiple processors, a single processor having multiple processing cores, and the like. Network interface 360 may be any type of network communication allowing computing system to communicate externally via computing network 305. For example, network interface 360 may include one or more of a wireless adapter, network interface card, cellular adapter, RFID module, NFC module, Bluetooth™ module, and the like. Network interface 360 may allow computing system 110 to communicate with controller 104.

Storage 358 may be, for example, a disk storage device. Although shown as a single unit, storage 358 may be a combination of fixed and/or removable storage devices, such as, but not limited to, fixed disk drives, removable memory cards, optical storage, network attached storage (NAS), storage area network (SAN), and the like.

Memory 356 may include counterfeit analysis module 112, operating system 364, and program code 366. Program code 366 may be accessed by processor 354 for processing (i.e., executing program instructions). Program code 366 may include, for example, steps discussed below in conjunction with FIG. 4. In a specific example, processor 354 may access program code 366 to execute an operation responsive to receiving an indication of counterfeit detection from controller 104.

Counterfeit analysis module 112 can be configured to analyze incoming signals from controller 104 of counterfeit banknote detection device 102. Counterfeit analysis module 112 may include video stream parser 376 and mapping agent 378. Counterfeit analysis module 112 may receive an incoming signal from controller 104. When the incoming signal is received from controller 104, counterfeit analysis module 112 may mark the incoming signal with a time stamp to denote a time when the signal was received. Responsive to receiving the incoming signal, stream parser 376 may access incoming one or more streams of video data from one or more cameras 374. For example, stream parser 376 may identify an interval of time centered about the time stamp of the incoming signal. Mapping agent 378 may leverage information within the incoming signal to identify a portion of the one or more video streams, in which counterfeit banknote detection device 102 is located. For example, mapping agent 378 may extract location information (provided by GPS module 318) from the signal, and focus on the respective location within the one or more streams of video data to identify an estimated location of counterfeit banknote detection device 102. Mapping agent 378 may then map the location of counterfeit banknote detection device to one or more patrons identified in the location. For example, mapping agent 378 may attempt to identify the patron that attempted to transact using a counterfeit banknote. Mapping agent 378 may do so by identifying a location of counterfeit banknote detection device 102 as well as one or more patrons positioned proximate to the location of counterfeit banknote detection device 102.

In some embodiments, counterfeit analysis module 112 may be further configured to communicate with third parties. For example, counterfeit analysis module 112 may be configured to notify authorities (e.g., law enforcement agency) of a counterfeit attempt, responsive to receiving an indication. In another example, counterfeit analysis module 112 may be configured to notify management of business facility of a counterfeit attempt, responsive to receiving an indication.

Although memory 356 is shown as a single entity, memory 356 may include one or more memory devices having blocks of memory associated with physical addresses, such as random access memory (RAM), read only memory (ROM), flash memory, or other types of volatile and/or non-volatile memory.

Figure 4:
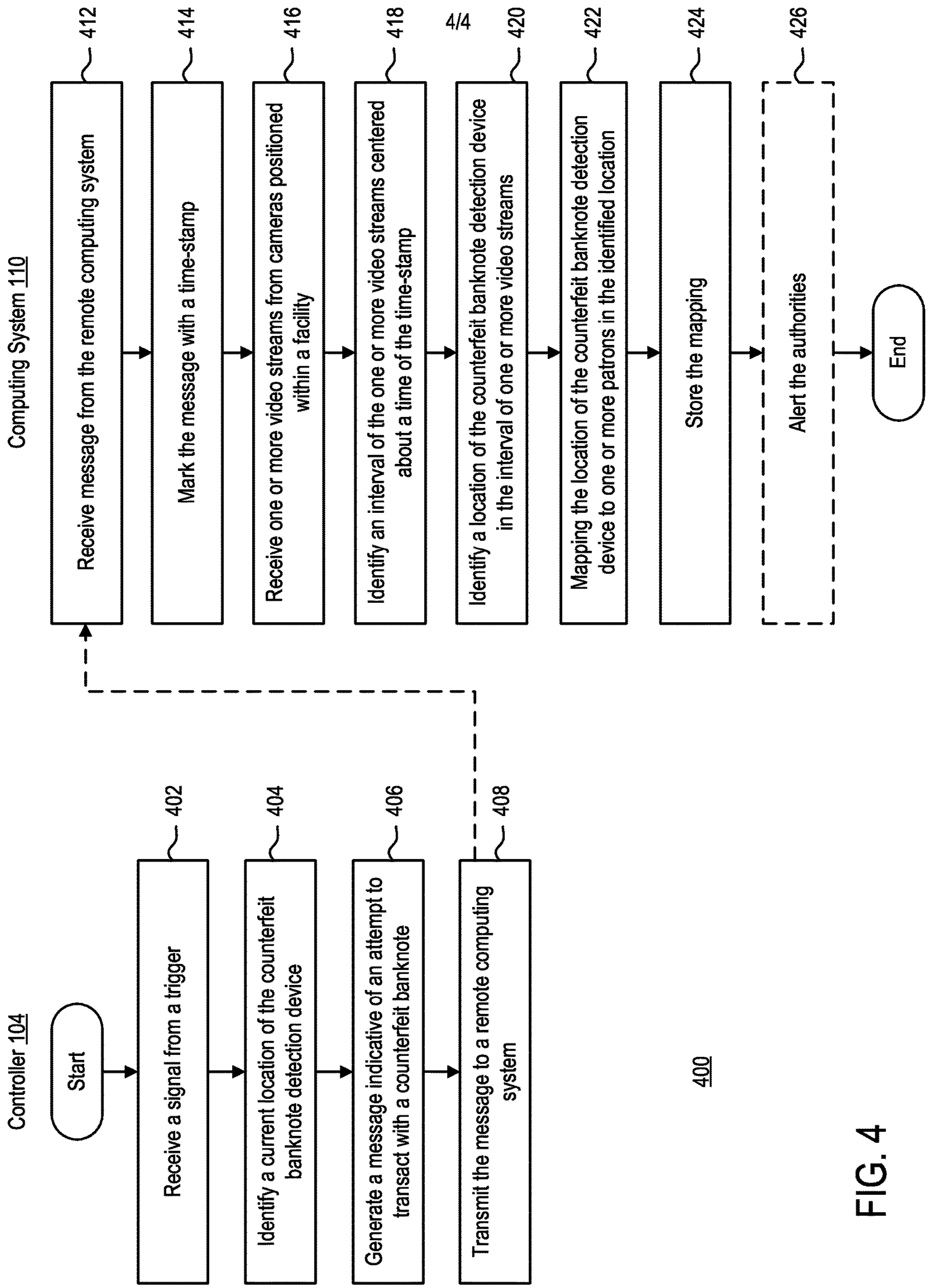
FIG. 4 is a flow diagram illustrating a method of detecting a counterfeit banknote, according to one embodiment.

FIG. 4 is a flow diagram illustrating a method 400 of detecting a counterfeit banknote, according to one embodiment. Although method 400 is discussed in conjunction with the system and components set forth in FIGS. 1-3, those skilled in the art can readily understand that similar systems and components may be used to carry out the operations discussed below.

Method 400 begins at step 402. At step 402, controller 104 positioned in counterfeit banknote detection device 102 receives a signal from trigger 210 that is indicative of detecting a counterfeit attempt. For example, the signal generated by trigger 210 and transmitted to controller 104 may be generated responsive to trigger 210 moving from a first, initial position to a second position.

At step 404, controller 104 may identify a current location of counterfeit banknote detection device 102. For example, GPS module 318 may identify a current location of counterfeit banknote detection device 102.

At step 406, controller 104 may generate an alert message. The alert message is indicative of identifying an attempt to transact with a counterfeit banknote. In some embodiments, alert message may include location information appended thereto. For example, controller 104 may append location information identified in step 304 to alert message.

At step 408, controller 104 may transmit the alert message to a remote computing system. For example, controller 104 may transmit alert message to computing system 110 via a wireless network (e.g., network 105). At step 412, computing system 110 receives the message from controller 104. For example, counterfeit analysis module 112 may receive the message from controller 104.

At step 414, upon receipt of message from controller 104, counterfeit analysis module 112 marks message with a time-stamp. For example, counterfeit analysis module 112 may mark the message with a time-stamp, contemporaneous with receiving the message from controller 104. Marking the message with a time-stamp aids in further analysis and reporting of the counterfeit attempt.

At step 416, counterfeit analysis module 112 receives on or more video streams from cameras positioned within a business facility. For example, one or more cameras (e.g., cameras 108) may be positioned in the business facility in which counterfeit banknote detection pen 102 is located. Accordingly, each of one or more cameras 374 is configured to capture one or more streams of video data of business facility.

At step 418, counterfeit analysis module 112 identifies an interval of the one or more streams of video data that correspond to a time indicated by the time-stamp. For example, video stream parser 376 of counterfeit analysis module 112 may parse through the one or more streams of video data to identify an interval of time centered about the time indicated by the time-stamp.

At step 420, counterfeit analysis module 112 may identify a location of counterfeit banknote detection device 102 in the one or more streams of video data. For example, mapping agent 378 may leverage information within the incoming signal to identify a portion of the one or more video streams, in which counterfeit banknote detection device 102 is located. For example, mapping agent 378 may extract location information (provided by GPS module 318) from the signal, and focus on the respective location within the one or more streams of video data to identify an estimated location of counterfeit banknote detection device 102.

At step 422, counterfeit analysis module 112 may map the location of counterfeit banknote detection device 102 to one or more patrons identified in the location. For example, mapping agent 378 may attempt to identify the patron that attempted to transact using a counterfeit banknote. Mapping agent 378 may do so by identifying a location of counterfeit banknote detection device 102 as well as one or more patrons positioned proximate to the location of counterfeit banknote detection device 102. At step 424, counterfeit analysis module 112 may store the mapping in memory 356 or storage 358.

In some embodiments, method 400 may further include step 426. At step 426, counterfeit analysis module 112 may alert one or more third parties of a counterfeit attempt. For example, counterfeit analysis module 112 may be configured to notify authorities (e.g., law enforcement agency) of a counterfeit attempt, responsive to receiving an indication. In another example, counterfeit analysis module 112 may be configured to notify management of business facility of a counterfeit attempt, responsive to receiving an indication.

While the foregoing is directed to embodiment described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:

receiving, by a computing system, an indication of an attempt to transact using a fraudulent banknote, wherein the indication of the attempt is received as an electronic signal from a counterfeit banknote detection device that detected the fraudulent banknote by applying a color-changing ink to a surface of the fraudulent banknote, the counterfeit banknote detection device comprising a controller disposed within the counterfeit banknote detection device and a trigger in electronic communication with the controller;

recording, by the computing system, a current time contemporaneous with receipt of the indication;

receiving, by the computing system, one or more video streams of a facility in which the counterfeit banknote detection device is located;

identifying, by the computing system, a portion of the one or more video streams corresponding to the current time; and mapping, by the computing system, the indication of the attempt to the portion of the one or more video streams.

2. The method of claim 1, wherein receiving the indication of the attempt to transact using the fraudulent banknote, wherein the indication of the attempt is received as the electronic signal from the counterfeit banknote detection device comprises:

receiving location information corresponding to a location of the counterfeit banknote detection device at the current time.

3. The method of claim 2, wherein receiving the location information corresponding to the location of the counterfeit banknote detection device comprises:

interfacing with a global positioning system module of the counterfeit banknote detection device.

4. The method of claim 2, further comprising:

identifying a location of the counterfeit banknote detection device in the portion of the one or more video streams.

5. The method of claim 1, further comprising:

generating an alert message to notify an authority of the attempt to transact using the fraudulent banknote.

6. The method of claim 1, wherein receiving the indication of the attempt to transact using the fraudulent banknote, wherein the indication of the attempt is received as the electronic signal from the counterfeit banknote detection device comprises:

receiving the indication from a second computing system tethered to the counterfeit banknote detection device.

7. The method of claim 1, wherein the counterfeit banknote detection device is wirelessly connected with the computing system.

8. A non-transitory computer readable medium comprising one or more sequences of instructions, which, when executed by one or more processors, causes a computing system to perform operations, comprising:

identifying, by the computing system, an attempt to transact using a fraudulent banknote, based on receiving a communication from a counterfeit banknote detection device that detected the fraudulent banknote by applying a color-changing ink to a surface of the fraudulent banknote, the counterfeit banknote detection device comprising a controller disposed within the counterfeit banknote detection device and a trigger in electronic communication with the controller;

recording, by the computing system, a current time contemporaneous with identifying the attempt;

receiving, by the computing system, one or more video streams of a facility in which the counterfeit banknote detection device is located;

identifying, by the computing system, a portion of the one or more video streams corresponding to the current time; and mapping, by the computing system, the attempt to the portion of the one or more video streams.

9. The non-transitory computer readable medium of claim 8, further comprising:

receiving location information corresponding to a location of the counterfeit banknote detection device at the current time.

10. The non-transitory computer readable medium of claim 9, wherein receiving location information corresponding to the location of the counterfeit banknote detection device comprises:

interfacing with a global positioning system module of the counterfeit banknote detection device.

11. The non-transitory computer readable medium of claim 9, further comprising:

identifying a location of the counterfeit banknote detection device in the portion of the one or more video streams.

12. The non-transitory computer readable medium of claim 8, further comprising:

generating an alert message to notify an authority of the attempt to transact using the fraudulent banknote.

13. The non-transitory computer readable medium of claim 8, wherein the computing system is tethered to the counterfeit banknote detection device.

14. The non-transitory computer readable medium of claim 8, wherein the counterfeit banknote detection device is wirelessly connected with the computing system.

15. A system, comprising:

a processor in communication with a controller of a counterfeit banknote detection device; and a memory having programming instruction stored thereon, which, when executed by the processor, performs operations comprising:

receiving an indication of an attempt to transact using a fraudulent banknote, wherein the indication of the attempt is received as an electronic signal from the counterfeit banknote detection device that detected the fraudulent banknote by applying a color-changing ink to a surface of the fraudulent banknote, the counterfeit banknote detection device;

recording a current time contemporaneous with receipt of the indication;

receiving one or more video streams of a facility in which the counterfeit banknote detection device is located;

identifying a portion of the one or more video streams corresponding to the current time; and mapping the indication of the attempt to the portion of the one or more video streams.

16. The system of claim 15, wherein receiving the indication of the attempt to transact using the fraudulent banknote, wherein the indication of the attempt is received as the electronic signal from the counterfeit banknote detection device comprises:

receiving location information corresponding to a location of the counterfeit banknote detection device at the current time.

17. The system of claim 16, wherein receiving the location information corresponding to the location of the counterfeit banknote detection device comprises:

interfacing with a global positioning system module of the counterfeit banknote detection device.

18. The system of claim 16, further comprising:

identifying a location of the counterfeit banknote detection device in the portion of the one or more video streams.

19. The system of claim 15, wherein the operations further comprise:

generating an alert message to notify an authority of the attempt to transact using the fraudulent banknote.

20. The system of claim 15, wherein receiving the indication of the attempt to transact using the fraudulent banknote, wherein the indication of the attempt is received as the electronic signal from the counterfeit banknote detection device comprises:

receiving the indication from a second computing system tethered to the counterfeit banknote detection device, the second computing system relaying the electronic signal.

* * * * *